(12) United States Patent
Lee et al.

(10) Patent No.: US 12,375,762 B2
(45) Date of Patent: Jul. 29, 2025

(54) DISPLAY DEVICE AND OPERATION METHOD THEREOF

(71) Applicant: Samsung Electronics Co., Ltd., Suwon-si (KR)

(72) Inventors: Jongin Lee, Suwon-si (KR); Sehyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 18/411,180

(22) Filed: Jan. 12, 2024

(65) Prior Publication Data

US 2024/0244295 A1    Jul. 18, 2024

Related U.S. Application Data

(63) Continuation of application No. PCT/KR2023/021717, filed on Dec. 27, 2023.

(30) Foreign Application Priority Data

Jan. 13, 2023  (KR) .................. 10-2023-0005470

(51) Int. Cl.
   *H04N 21/443*     (2011.01)
   *H04N 21/41*      (2011.01)
   *H04N 21/4363*    (2011.01)

(52) U.S. Cl.
   CPC ..... *H04N 21/4436* (2013.01); *H04N 21/4122* (2013.01); *H04N 21/43635* (2013.01)

(58) Field of Classification Search
   CPC ........... H04N 21/4436; H04N 21/4122; H04N 21/43635
   (Continued)

(56) References Cited

U.S. PATENT DOCUMENTS 6,297,601 B1    10/2001  Kang
2002/0062455 A1*  5/2002  Lee .................. G06F 1/3203
                                                 713/323
(Continued)

FOREIGN PATENT DOCUMENTS

CN    106155684 A    11/2016
KR    100598412 B1   7/2006
(Continued)

OTHER PUBLICATIONS

Search Report and Written Opinion dated Mar. 29, 2024 issued in International Patent Application No. PCT/KR2023/021717.

*Primary Examiner* — John W Miller
*Assistant Examiner* — Omer Khalid
(74) *Attorney, Agent, or Firm* — Nixon & Vanderhye, P.C.

(57) ABSTRACT

Provided is a display device including: a display, a communication unit comprising communication circuitry, a memory storing one or more instructions, and at least one processor, comprising processing circuitry, configured to execute the one or more instructions to: control the communication unit to transmit image data received from an external device connected to the display device, to another display device connected to the display device, based on receiving a power-off signal, identify whether transmitting the image data to the other display device is being performed, based on transmitting the image data to the other display device being performed, turn off the display and enter a power-off suspend mode in which transmitting the image data to the other display device is maintained, and based on transmitting the image data to the other display device being terminated in the power-off suspend mode, switch to a power saving mode.

20 Claims, 12 Drawing Sheets

(58) Field of Classification Search
USPC .......................................................... 348/730
See application file for complete search history.

(56) References Cited

U.S. PATENT DOCUMENTS

| | | | | |
|---|---|---|---|---|
| 2012/0257080 | A1* | 10/2012 | Cheruel | G09G 3/3406 |
| | | | | 348/E5.022 |
| 2014/0198253 | A1 | 7/2014 | Kim et al. | |
| 2015/0323981 | A1* | 11/2015 | Yarvis | G06F 1/3212 |
| | | | | 713/323 |
| 2016/0103477 | A1* | 4/2016 | Park | G06F 9/4418 |
| | | | | 713/323 |
| 2017/0220357 | A1* | 8/2017 | Choi | G09G 5/003 |
| 2022/0059000 | A1* | 2/2022 | Je | H04N 21/4221 |

FOREIGN PATENT DOCUMENTS

| | | |
|---|---|---|
| KR | 10-2008-0006217 | 1/2008 |
| KR | 10-2011-0009574 | 1/2011 |
| KR | 10-2014-0091356 | 7/2014 |
| KR | 20150119701 A | 10/2015 |
| KR | 101626161 B1 | 6/2016 |
| KR | 101635564 B1 | 7/2016 |
| KR | 20180103277 A | 9/2018 |
| KR | 10-2219877 | 2/2021 |
| KR | 10-2022-0023592 | 3/2022 |
| KR | 10-2023-0004139 | 1/2023 |

* cited by examiner

DISPLAY DEVICE AND OPERATION METHOD THEREOF

CROSS-REFERENCE TO RELATED APPLICATIONS

This application is a continuation of International Application No. PCT/KR2023/021717 designating the United States, filed on Dec. 27, 2023, in the Korean Intellectual Property Receiving Office and claiming priority to Korean Patent Application No. 10-2023-0005470, filed on Jan. 13, 2023, in the Korean Intellectual Property Office, the disclosures of each of which are incorporated by reference herein in their entireties.

BACKGROUND

Field

The disclosure relates to a display device capable of transmitting an image received from an external device, to another display device, and an operating method of the display device.

Description of Related Art

Display devices include devices having a function of displaying an image viewable to a user. A user may view a broadcast through a display device. The display device displays, on a display, a broadcast selected by the user from among broadcast signals transmitted from a broadcasting station. In addition, smart televisions (TVs) for providing a variety of content in addition to a broadcasting function have been provided. Smart TVs perform a function of analyzing content desired by a user and providing the content to the user without the user's manipulation, rather than being operated manually according to the user's selection.

In addition, a display device such as a TV, which is connected to an external device such as a set-top box, a Blu-ray disk player, a digital versatile disk (DVD) player, a streaming device, or a home theater, may receive an image from the external device and display the image. In addition, the display device may control the connected external device based on a control signal input to the display, and in particular, may off the external device.

In addition, the display device may transmit and receive image signals to and from another display device using a short-range wired/wireless communication network.

SUMMARY

A display device according to an example embodiment of the disclosure may include a display, a communication unit comprising communication circuitry, a memory storing one or more instructions, and at least one processor, comprising processing circuitry, configured to execute the one or more instructions.

The at least one processor may be configured to execute the one or more instructions to control the communication unit to transmit image data received from an external device connected to the display device, to another display device connected to the display device.

The at least one processor may be configured to execute the one or more instructions to, based on receiving a power-off signal, identify whether an operation of transmitting the image data to the other display device is being performed.

The at least one processor may be configured to execute the one or more instructions to, based on the operation of transmitting the image data to the other display device being performed, turn off the display and enter a power-off suspend mode in which the operation of transmitting the image data to the other display device is maintained.

The at least one processor may be configured to execute the one or more instructions to, based on the operation of transmitting the image data to the other display device being terminated in the power-off suspend mode, switch to a power saving mode.

A method of operating a display device according to an example embodiment of the disclosure may include: transmitting image data received from an external device connected to the display device, to another display device connected to the display device.

The method of operating the display device according to an example embodiment of the disclosure may further include: receiving a power-off signal.

The method of operating the display device according to an example embodiment of the disclosure may further include, based on receiving the power-off signal, identifying whether an operation of transmitting the image data to the other display device is being performed.

The method of operating the display device according to an example embodiment of the disclosure may further include, based on the operation of transmitting the image data to the other display device being performed, turning off a display and entering a power-off suspend mode in which the operation of transmitting the image data to the other display device is maintained.

The method of operating the display device according to an example embodiment of the disclosure may further include, based on the operation of transmitting the image data to the other display device being terminated in the power-off suspend mode, switching to a power saving mode.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
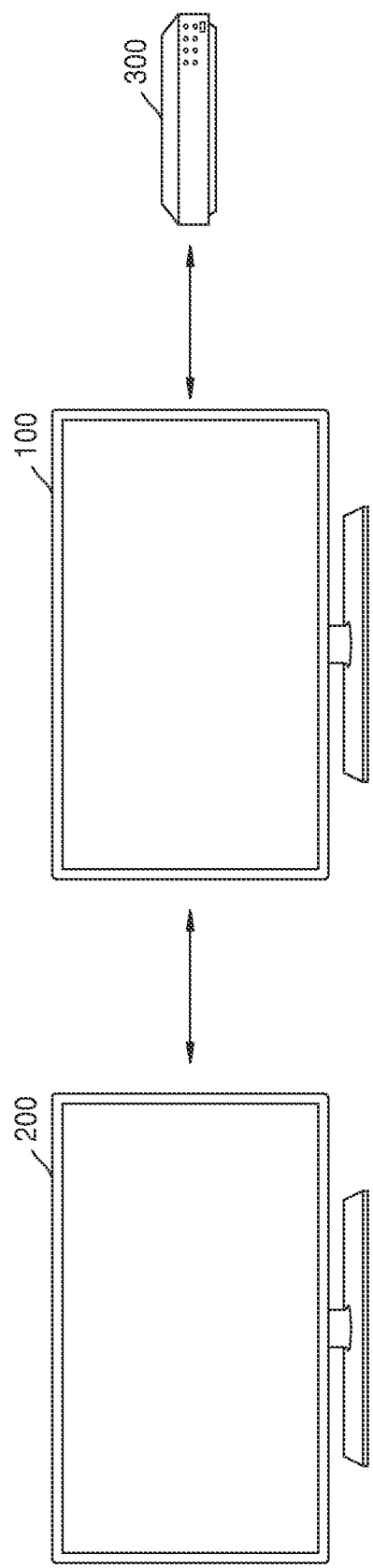
FIG. 1 is a diagram illustrating a first display device, and a second display device and an external device both connected to the first display device, according to an embodiment of the disclosure.

The terms used herein will be briefly described, and then the disclosure will be described in greater detail below with reference to the various figures.

Although the terms used herein are selected from among common terms that are currently widely used in consideration of their functions in the disclosure, the terms may be different according to an intention of one of ordinary skill in the art, a precedent, or the advent of new technology. Also, in particular cases, the terms may be arbitrarily selected, in which case, the meaning of those terms will be described in detail in the corresponding part of the detailed description. Therefore, the terms used herein are not merely designations of the terms, but the terms are defined based on the meaning of the terms and content throughout the disclosure.

Throughout the disclosure, when a part "includes" a component, it may refer, for example, to the part may additionally include other components rather than excluding other components as long as there is no particular opposing recitation. In addition, as used herein, the terms such as " . . . . er (or)", " . . . unit", " . . . module", etc., denote a unit that performs at least one function or operation, which may be implemented as hardware or software or a combination thereof.

Hereinafter, various example embodiments of the disclosure will be described with reference to the accompanying drawings. The disclosure may, however, be embodied in many different forms and should not be construed as being limited to the embodiments set forth herein. In order to clearly describe the disclosure, portions that are not relevant to the description of the disclosure may be omitted, and similar reference numerals are assigned to similar elements throughout the disclosure.

In the disclosure, the term "user" refers to a person who controls systems, functions, or operations, and may include a developer, an administrator, or an installer.

In addition, in the disclosure, the term 'image' or 'picture' may refer to a still image, a moving image including a plurality of continuous still images (or frames), or a video.

FIG. 1 is a diagram illustrating a first display device, and a second display device and an external device both connected to the first display device, according to an embodiment of the disclosure.

A first display device 100 and a second display device 200 according to an embodiment of the disclosure may include televisions (TVs), but this is only an example, and may be implemented in various forms including displays. For example, the first display device 100 and the second display device 200 may be implemented as various electronic devices such as, for example, and without limitation, mobile phones, tablet personal computers (PCs), digital cameras, camcorders, laptop computers, tablet PCs, desktop computers, electronic book terminals, digital broadcast terminals, personal digital assistants (PDAs), portable multimedia players (PMPs), navigation devices, MP3 players, or wearable devices.

In addition, the first display device 100 and the second display device 200 may be stationary or mobile, and may include digital broadcast receivers capable of receiving a digital broadcast. In addition, the first display device 100 and the second display device 200 may be implemented, for example, and without limitation, as flat display devices, curved display devices with a screen having a curvature, or flexible display devices having an adjustable curvature. The output resolution of the first display device 100 and the second display device 200 may include, for example, and without limitation, a high-definition (HD) resolution, a full-HD resolution, an ultra-HD resolution, or a resolution higher than the ultra-HD resolution.

An external device 300 according to an embodiment of the disclosure may include a device for providing content to a display device by reproducing the content. For example, the content may refer to multimedia content and may include an image, a video, an audio, a text, a game, an application, and the like, but is not limited thereto.

The external device 300 according to an embodiment of the disclosure may include, for example, and without limitation, a set-top box, a Blu-ray Disk player, a digital versatile disk (DVD) player, a game device, a digital camera, a camcorder, a streaming device, a home theater, and the like. The external device 300 include various electronic devices such as, for example, and without limitation, a smart phone, a tablet PC, a mobile terminal, a video phone, an e-book reader, a desktop PC, a laptop PC, a netbook computer, a PDA, a PMP, a navigation device, an MP3 player, a wearable device, or the like.

The first display device 100 and the external device 300 according to an embodiment of the disclosure may be connected to each other through wired or wireless communication. For example, and without limitation, the first display device 100 may be connected to the external device 300, through a High-Definition Multimedia Interface (HDMI) port, a Mobile High-Definition Link (MHL) port, a Universal Serial Bus (USB) port, a DisplayPort (DP) port, a Thunderbolt port, a Video Graphics Array (VGA) port, a red-green-blue (RGB) port, a D-subminiature (D-SUB), a Digital Visual Interface (DVI) port, a component jack, a PC port, or the like. However, the disclosure is not limited thereto, and the first display device 100 and the external device 300 may be connected to each other through short-range wireless communication such as a wireless local area network (LAN) (e.g., Wi-Fi) or Bluetooth. The first display device 100 and the external device 300 may transmit or receive a video, an audio, and additional information to or from each other using communication therebetween.

Meanwhile, in various example embodiments of the disclosure, an example will be described in which the first display device 100 and the external device 300 are connected to each other through HDMI communication (an HDMI cable).

The first display device 100 and the external device 300 connected to each other through an HDMI cable may transmit or receive data and information to or from each other using, for example, and without limitation, a transition minimized differential signaling (TMDS) channel, a display data channel (DDC), consumer electronics control (CEC), or the like. For example, the TMDS channel may be used to transmit video data and audio data. In addition, the DDC may be used to transmit extended display identification data (EDID) information (information such as display product type, resolution, screen size, luminance, etc. indicating display characteristics) of the first display device 100, which may be a sink device, to the external device 300, which is a source device. In addition, the first display device 100 and the external device 300 may control each other through the CEC.

The external device 300 according to an embodiment of the disclosure may transmit image data (or image signals) to the first display device 100.

The first display device 100 and the second display device 200 according to an embodiment of the disclosure may be connected to each other through wired or wireless communication.

For example, and without limitation, the first display device 100 and the second display device 200 may be connected to each other through short-range wireless communication, such as wireless LAN (e.g., Wi-Fi), Bluetooth, or the like. The first display device 100 and the external device 300 may transmit or receive a video, an audio, and additional information to or from each other using communication therebetween.

The first display device 100 according to an embodiment of the disclosure may receive image data from the external device 300. The first display device 100 may transmit the received image data to the second display device 200. In various example embodiments of the disclosure, an example will be described in which the first display device 100 is a source device and the second display device 200 is a sink device.

The first display device 100 may encode the received image data and transmit the encoded image data to the second display device 200. Accordingly, the second display device 200 may receive and display the image data output from the external device 300 without directly connecting the external device 300 to the second display device 200.

For example, when the first display device 100 and the second display device 200 may be located in different spaces and the external device 300 is connected to the first display device 100, the second display device 200 may receive image data output from the external device 300 through the first display device 100 and display the received image data.

Meanwhile, when the first display device 100 according to an embodiment of the disclosure is powered off while performing an operation of transmitting image data of the external device 300 to the second display device 200, viewing of an external image by a user of the second display device 200 may be unintentionally terminated.

For example, when the first display device 100 and the external device 300 are connected to each other through an HDMI cable, the first display device 100 and the external device 300 may control each other through the HDMI CEC described above. For example, when the first display device 100 receives a turn-off signal, the first display device 100 may transmit the turn-off signal to the external device 300 connected thereto. Accordingly, image data of the external device 300 may not be transmitted to the second display device 200.

Thus, even when the first display device 100 according to an embodiment of the disclosure receives a turn-off signal while performing an operation of transmitting image data of the external device 300 to the second display device 200, the first display device 100 may be controlled to continuously perform the operation of transmitting the image data of the external device 300 to the second display device 200, without powering off the first display device 100 and the external device 300.

Hereinafter, more detailed descriptions will be provided with reference to the drawings.

Figure 2:
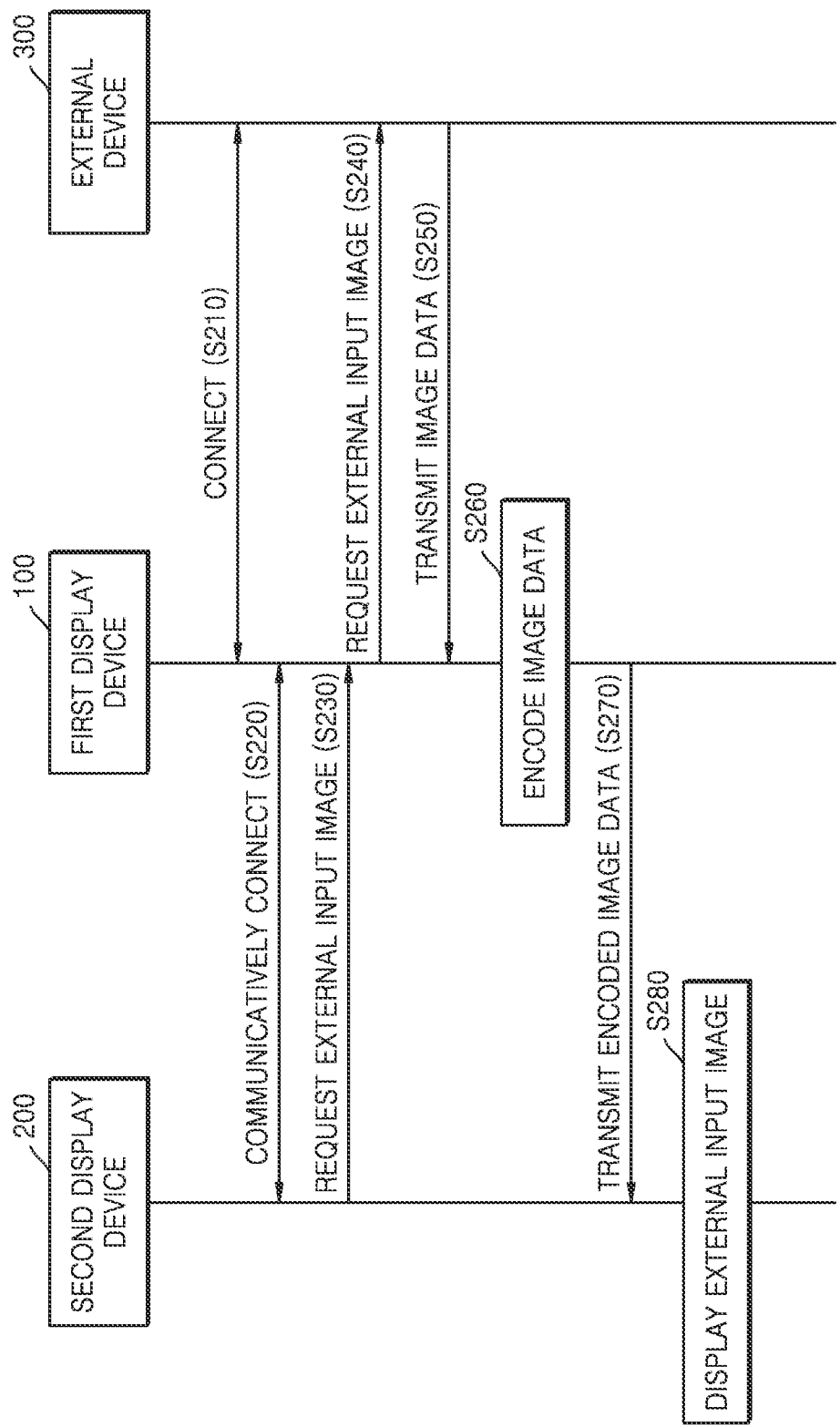
FIG. 2 is a signal flow diagram illustrating an example method, performed by a first display device, of transmitting an image received from an external device to a second display device, according to an embodiment of the disclosure.

FIG. 2 is a signal flow diagram illustrating an example method, performed by a first display device, of transmitting an image received from an external device to a second display device, according to an embodiment of the disclosure.

Referring to FIG. 2, the first display device 100 according to an embodiment of the disclosure may be connected to the external device 300 (S210).

For example, the first display device 100 may be connected to the external device 300, through an HDMI port, an MHL port, a USB port, a DP port, a Thunderbolt port, a VGA port, an RGB port, a D-SUB, a DVI port, a component jack, a PC port, or the like. However, the disclosure is not limited thereto, and the first display device 100 and the external device 300 may be connected to each other through short-range wireless communication such as a wireless LAN (e.g., Wi-Fi) or Bluetooth, or the like. The first display device 100 and the external device 300 may transmit or receive a video, an audio, and additional information to or from each other using communication therebetween.

The first display device 100 and the second display device 200 according to an embodiment of the disclosure may be communicatively connected to each other using at least one communication method (S220).

For example, the first display device 100 and the second display device 200 may be connected to each other through short-range wireless communication, such as wireless LAN (e.g., Wi-Fi) or Bluetooth, or the like. The first display device 100 and the external device 300 may transmit or receive a video, an audio, and additional information to or from each other using communication therebetween.

The second display device 200 according to an embodiment of the disclosure may perform connection with any one of external devices connected to the first display device 100. The connection between the second display device 200 and the external device 300 may refer, for example, to connection through the first display device 100, rather than direct connection.

The second display device 200 may request an external input image from the first display device 100 (S230). The external input image may refer, for example, to an image received from the external device 300.

In response to the request for the external input image received from the second display device 200, the first display device 100 may request the external input image from the external device 300 (S240).

The external device 300 according to an embodiment of the disclosure may transmit image data to the first display device 100 (S250).

The first display device 100 may encode the image data received from the external device 300 (S260).

For example, the first display device 100 may reduce the amount of information by encoding the image data received from the external device 300. For example, the encoding may include, for example, and without limitation, predicting image data to generate prediction data, generating residual data corresponding to a difference between the image data and the prediction data, transforming the residual data that is a spatial domain component into a frequency domain component, quantizing the residual data transformed into the frequency domain component, and entropy-encoding the quantized residual data. The encoding may be implemented through any one of image processing methods using frequency conversion such as, for example, and without limitation, MPEG-2, H.264 advanced video coding (AVC), MPEG-4, high efficiency video coding (HEVC), VC-1, VP8, VP9, or AOMedia Video 1 (AV1). However, the disclosure is not limited thereto.

The first display device 100 may transmit the encoded image data to the second display device 200 (S270).

For example, the first display device 100 may transmit the encoded image data to the second display device 200 in the form of a bitstream.

The second display device 200 may decode the image data received from the first display device 100, and display the external input image on a display (S280).

For example, the decoding may include entropy-decoding the image data to generate quantized residual data, dequantizing the quantized residual data, transforming the residual data that is a frequency domain component to a spatial domain component, generating prediction data, and reconstructing image data using the prediction data and the residual data. The decoding may be implemented through an image reconstruction method corresponding, for example, to any one of image compression methods using frequency conversion, such as, for example, and without limitation, MPEG-2, H.264, MPEG-4, HEVC, VC-1, VP8, VP9, or AV1, which is used in the encoding.

Figure 3:
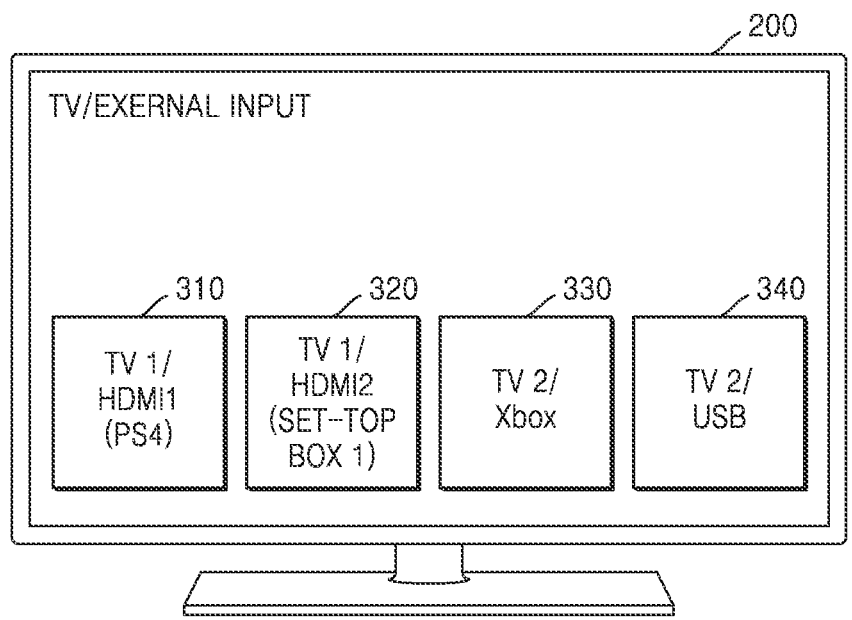
FIG. 3 is a diagram illustrating an example in which a second display device sets, as external inputs, external devices connected to a first display device, according to an embodiment of the disclosure.

FIG. 3 is a diagram illustrating an example in which a second display device sets, as external inputs, external devices connected to a first display device, according to an embodiment of the disclosure.

Referring to FIG. 3, the second display device 200 according to an embodiment of the disclosure may display a menu for setting an external device based on a user input.

For example, the second display device 200 may receive, from a control device, a control signal or a control command corresponding to a user input. The control device may include, for example, and without limitation, a remote controller, a keyboard, a mouse, or the like, and may transmit and receive data, information, signals, and the like to and from the second display device 200 through wired or wireless communication. However, the disclosure is not limited thereto.

The menu for setting an external input may include a list of connectable external devices. The list of external devices may include external devices connected to the second display device 200, or external devices connected to the first display device 100 connected to the second display device 200. For example, the list of external devices may include a first item 310 corresponding to a first external device connected to the second display device 200, a second item 320 corresponding to a second external device connected to the second display device 200, a third item 330 corresponding to a third external device connected to the first display device 100, and a fourth item 340 corresponding to a fourth external device connected to the first display device 100. In addition, the list of external devices may include external devices connected to other display devices than the first display device 100, which are connected to the second display device 200.

When the second display device 200 receives an input for selecting any one of a plurality of items included in the list of external devices, the second display device 200 may receive an external input image from an external device corresponding to the selected item, and display the received external input image.

For example, when the first item 310 or the second item 320 is selected, the second display device 200 may receive an image from the first external device or the second external device connected to the second display device 200, and display the received image.

When the third item 330 or the fourth item 340 is selected, the second display device 200 may receive, through the first display device 100, an image corresponding to the third external device (a third external input image), or an image corresponding to the fourth external device (a fourth external input image).

This will be described in greater detail below with reference to FIG. 4.

Figure 4:
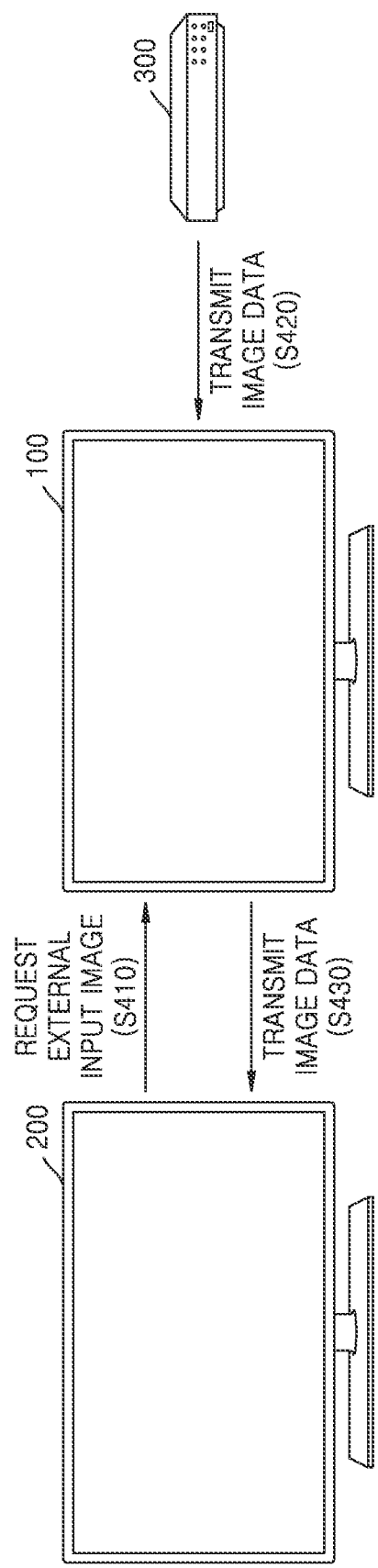
FIG. 4 is a diagram illustrating an example operation, performed by a first display device, of transmitting an external input image to a second display device, according to an embodiment of the disclosure.

FIG. 4 is a diagram illustrating an example operation, performed by a first display device, of transmitting an external input image to a second display device, according to an embodiment of the disclosure.

The second display device 200 according to an embodiment of the disclosure may request an external input image from the first display device 100 (S410).

For example, as described above with reference to FIG. 3, when the second display device 200 receives an input for selecting the third external device or the fourth external device connected to the first display device 100 in the external input setting menu, the second display device 200 may request an external input image from the first display device 100.

The first display device 100 may receive image data from the external device 300 corresponding to the external input image requested by the second display device 200 (S420). The first display device 100 may encode the image data received from the external device 300, and transmit the encoded image data to the second display device 200 (S430).

When the first display device 100 according to an embodiment of the disclosure is powered off or in a power saving mode and receives a request for an external input image from the second display device 200, the first display device 100 may turn on a process and power for transmitting the external input image to the second display device 200.

In addition, the first display device 100 may perform an operation of transmitting the external input image to the second display device 200 in a state where the display of the first display device 100 is turned on or off.

The second display device 200 according to an embodiment of the disclosure may display the external input image received from the first display device 100.

Figure 5:
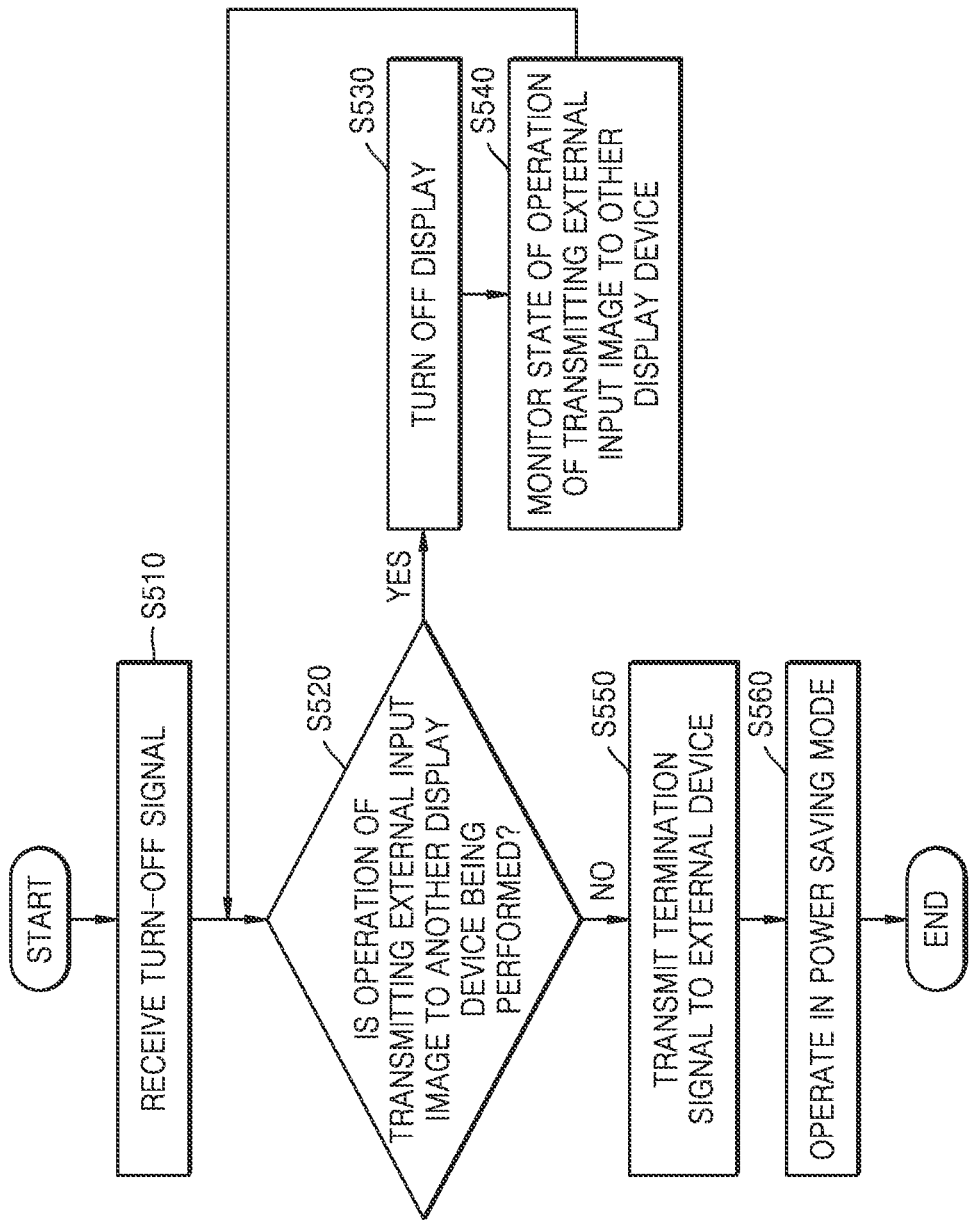
FIG. 5 is a flowchart illustrating an example method performed by a display device when receiving a turn-off signal, according to an embodiment of the disclosure.

FIG. 5 is a flowchart illustrating an example method performed by a display device when receiving a turn-off signal, according to an embodiment of the disclosure.

Powering off according to an embodiment of the disclosure may refer to turning off a display device that is reproducing image data. Powering off may also be referred to as turning off.

The first display device 100 according to an embodiment of the disclosure may receive a turn-off signal (S510).

For example, a first control device controlling the first display device 100 may include a power on/off button, and when the power on/off button is pressed, may transmit a turn-off signal to the first display device 100. The first control device may include a microphone to receive a voice command corresponding to 'power off', and when receiving the voice command corresponding to 'power off', may transmit a turn-off signal to the first display device 100. However, the disclosure is not limited thereto.

The first control device according to an embodiment of the disclosure may transmit a turn-off signal to the first display device 100 using an infrared (IR) communication method. However, the disclosure is not limited thereto, and the first control device may, for example, and without limitation, transmit a control signal to the first display device using wireless LAN (e.g., Wi-Fi), Bluetooth, Bluetooth Low Energy (BLE), ultrasonic waves, Zigbee, etc.

The turn-off signal may correspond to a command to change an operating mode of a display device from a normal mode to power saving mode or suspend mode.

In addition, when switching from the normal mode to the power saving mode, the power supplied to a memory (not shown) of the first display device 100 may be maintained, and the data stored in the memory may be maintained even after switching to the power saving mode.

When the first display device 100 according to an embodiment of the disclosure receives a turn-off signal, the first display device 100 may identify whether the first display device 100 is performing an operation of transmitting an external input image to another display device (S520).

For example, the first display device 100 may perform an operation of encoding image data received from the external device 300 connected to the first display device 100, and transmitting the encoded image data to the second display device 200 connected to the first display device 100.

When the operation of transmitting an external input image to another display device is being performed (Yes in operation S520), the first display device 100 according to an embodiment of the disclosure may turn off the display (S530). Turning off the display may refer to changing a display screen to a black screen.

In addition, the first display device 100 may continuously perform the operation of transmitting the external input image to the other display device without stopping.

The first display device 100 may monitor the state of the operation of transmitting the external input image to the other display device (S540).

In addition, when the first display device 100 according to an embodiment of the disclosure is not performing an operation of transmitting an external input image to another display device (No in operation S520), or when an operation of transmitting an external input image to another display device is terminated, the first display device 100 may transmit a termination signal to the external device 300 (S550).

For example, when the first display device 100 and the external device 300 are connected to each other through an HDMI cable, the first display device 100 may control the external device 300 using HDMI-CEC. The first display device 100 may power off the external device 300 by transmitting a turn-off signal to the external device 300 using HDMI-CEC.

The first display device 100 according to an embodiment of the disclosure may operate in the power saving mode or the suspend mode (S560).

The power saving mode may refer, for example, to an operation state in which power is not supplied to a processor. For example, as scheduling of the process scheduler is stopped, an operation of the processor may be stopped.

For example, the first display device 100 may store information about operations being performed by the first display device 100 in the memory. In the power saving mode, the power supplied to the memory of the first display device 100 is maintained, and thus, data stored in the memory may be maintained even when the first display device 100 switches to the power saving mode.

In addition, the first display device 100 may include a microcomputer, and the microcomputer may receive power to remain turned on even in the power saving mode. When the microcomputer receives a power-on signal (may also be referred to as a turn-on signal) in the suspend mode, power may be supplied to the processor, and the processor may operate in the normal mode. For example, the processor may use data stored in the memory to resume the operation state of the display device in the state before switching to the power saving mode.

Figure 6:
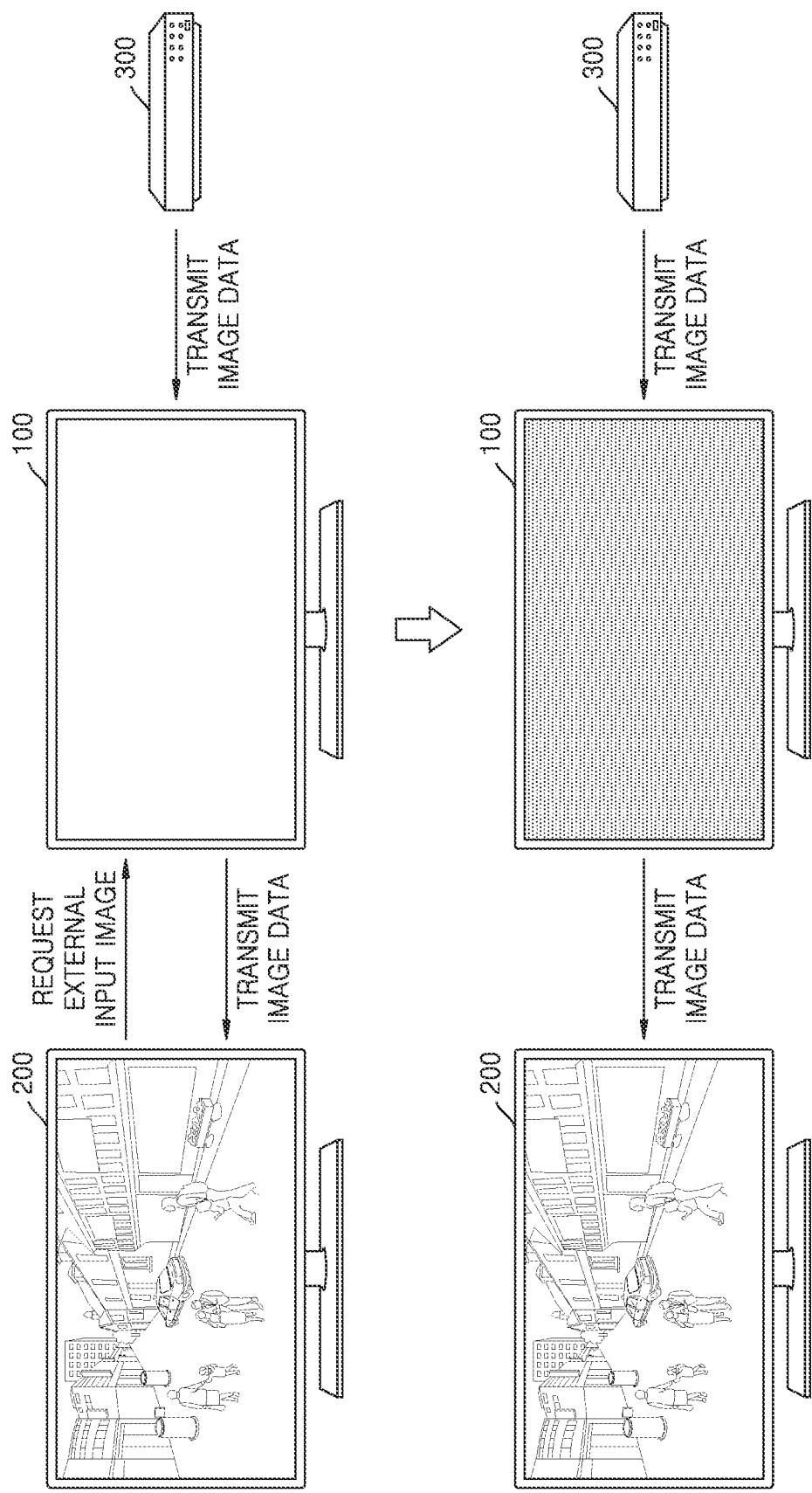
FIG. 6 is a diagram illustrating an example operation, performed by a first display device, of transmitting an external input image to a second display device, according to an embodiment of the disclosure.

FIG. 6 is a diagram illustrating an example operation, performed by a first display device, of transmitting an external input image to a second display device, according to an embodiment of the disclosure.

Referring to FIG. 6, the first display device 100 according to an embodiment of the disclosure may be connected to the external device 300 through an input/output interface. In addition, the first display device 100 may be connected to the second display device 200 through wired or wireless communication.

The second display device 200 according to an embodiment of the disclosure may set the external device 300 connected to the first display device 100, as a source device through an external input setting menu. When the external device 300 is set as a source device, the second display device 200 may request an external input image corresponding to the external device 300, from the first display device 100.

In response to the request received from the second display device 200, the first display device 100 may receive image data from the external device 300.

The first display device 100 may display the image data received from the external device 300, or may display image data received from another external device connected to the first display device 100, separately from the image data received from the external device 300.

The first display device 100 may encode the image data received from the external device 300, and transmit the encoded image data to the second display device 200.

Accordingly, the second display device 200 may decode the image data received from the first display device 100 and display the decoded image data on the display.

The first display device 100 may receive a turn-off signal from the first control device while performing an operation of transmitting image data to the second display device 200.

When receiving the turn-off signal, the first display device 100 may turn off only the display and maintain the operation of transmitting the image data to the second display device 200 without stopping.

The first display device 100 may monitor whether the operation of transmitting the image data to the second display device 200 is being continuously performed.

Figure 7:
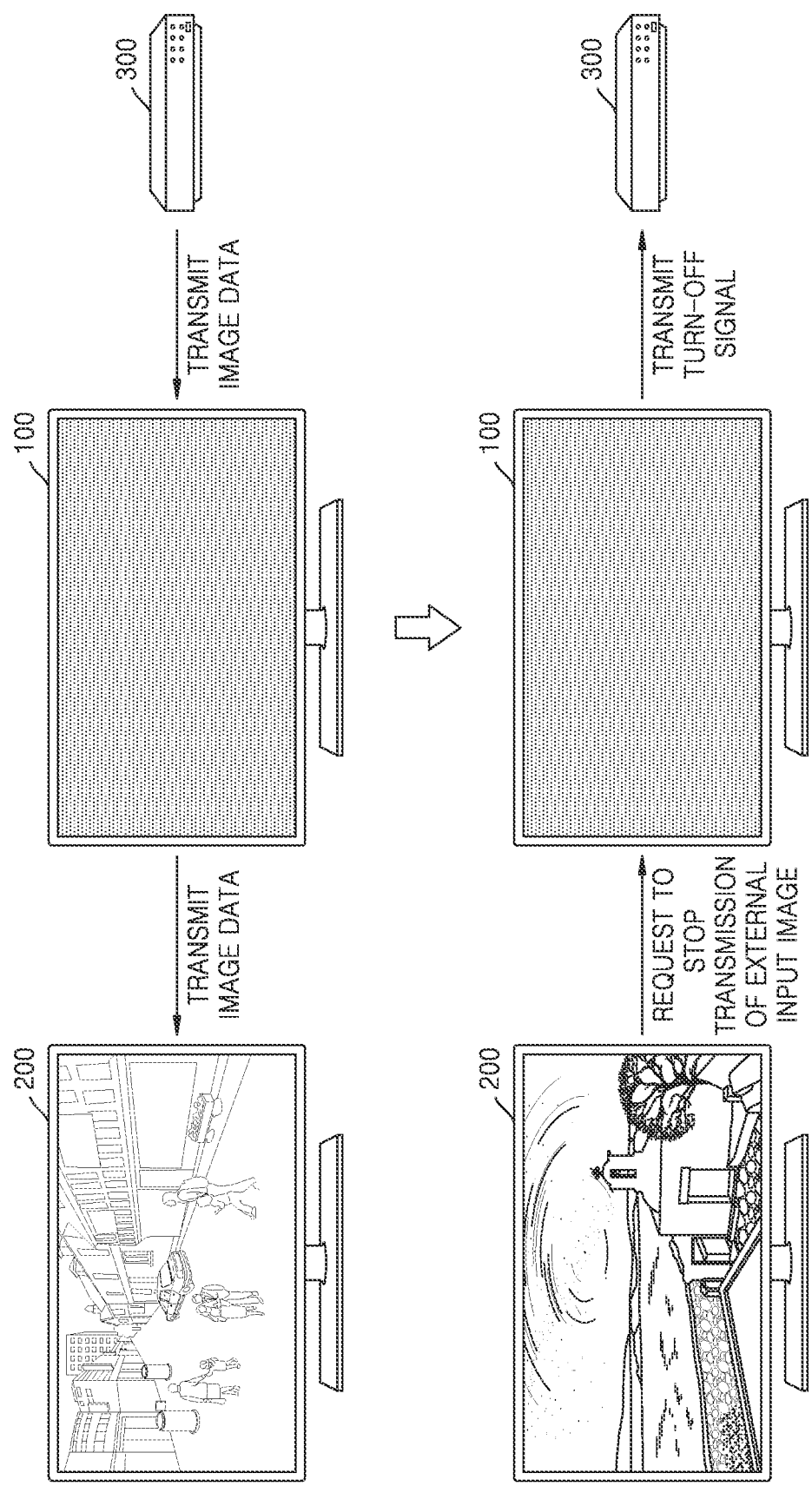
FIGS. 7 and 8 are diagrams illustrating an example operation, performed by a first display device, of transmitting an external input image to a second display device, according to an embodiment of the disclosure.
Figure 8:
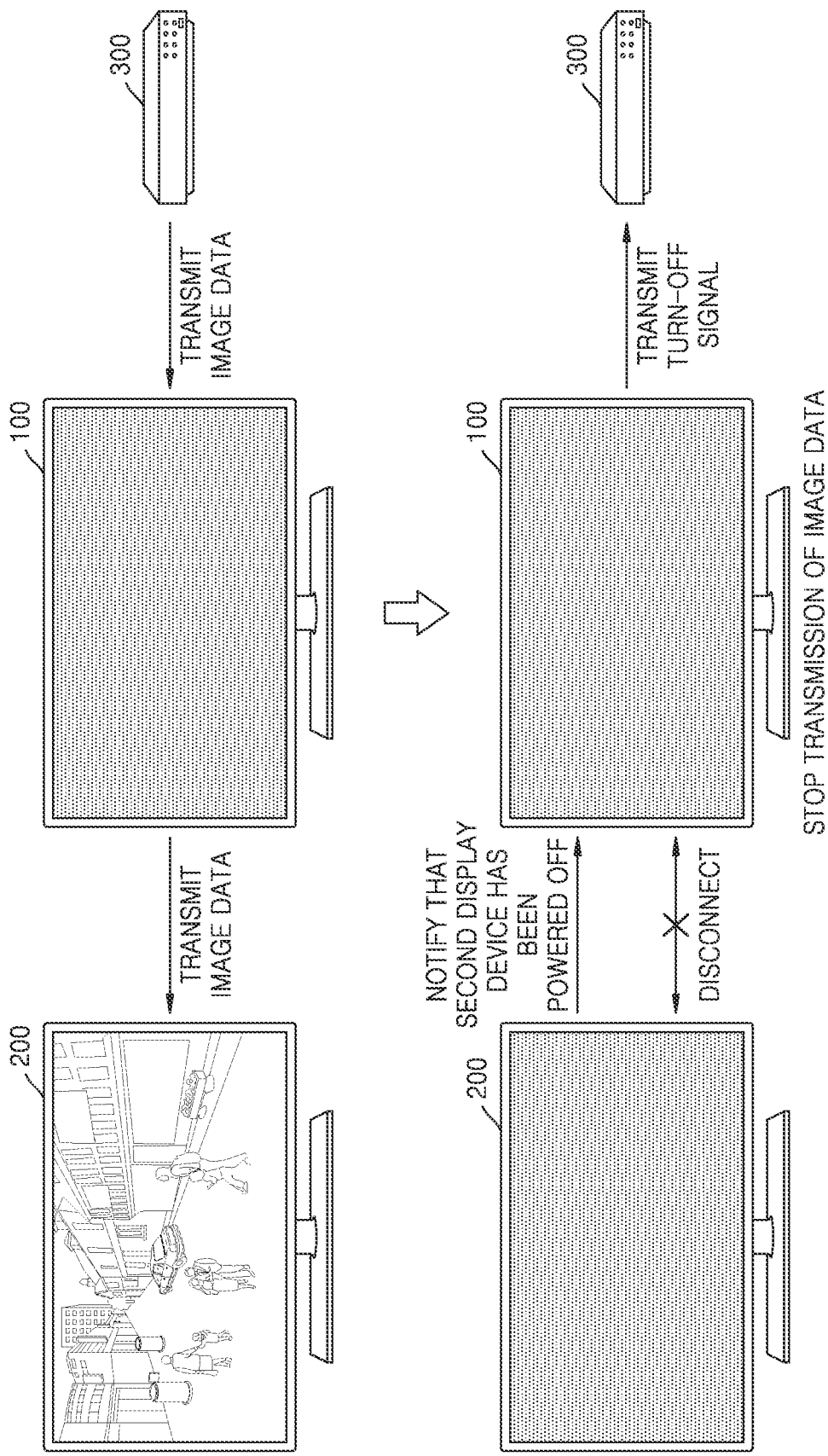

FIGS. 7 and 8 are diagrams illustrating an example operation, performed by a first display device, of transmitting an external input image to a second display device, according to an embodiment of the disclosure.

Referring to FIG. 7, the second display device 200 according to an embodiment of the disclosure may change the source device while receiving and displaying the external input image corresponding to the external device 300 from the first display device 100, as illustrated in and described above with reference to FIG. 6. For example, the second display device 200 may switch to another source device using the external input setting menu. The other source device (not shown) may be a source device directly connected to the second display device 200.

The second display device 200 may transmit, to the first display device 100, a request to stop the transmission of the external input image. When the first display device 100 receives, from the second display device 200, the request to stop the transmission of the external input image, the first display device 100 may stop or terminate the operation of receiving the image data from the external device 300, encoding the received image data, and transmitting the encoded image data to the second display device 200.

As the transmission of the external input image to the second display device 200 is stopped, the first display device 100 may transmit a turn-off signal to the external device 300 and enter the power saving mode.

The communication connection between the first display device 100 and the second display device 200 may be maintained without being released. As the communication connection between the first display device 100 and the second display device 200 is maintained, when the second display device 200 requests the external input image again, the first display device 100 may transmit the external input image to the second display device 200.

When the source device changed by the second display device 200 is a second external device also connected to the first display device 100, the first display device 100 may receive image data from the second external device without entering the power saving mode. The first display device 100 may encode the image data received from the second external device and transmit the encoded image data to the second display device 200.

In addition, referring to FIG. 8, the second display device 200 according to an embodiment of the disclosure may receive a turn-off signal from the second control device controlling the second display device 200, while receiving and displaying image data corresponding to the external device 300 from the first display device 100, as illustrated in and described above with reference to FIG. 6.

When the second display device 200 receives the turn-off signal, the second display device 200 may transmit, to the first display device 100, information indicating that the second display device 200 has been powered off. The second display device 200 may enter the power saving mode.

When the first display device 100 receives the information indicating that the second display device 200 has been powered off from the second display device 200, the first display device 100 may stop or terminate the operation of receiving the image data from the external device 300, encoding the received image data, and transmitting the encoded image data to the second display device 200.

As the transmission of the image data to the second display device 200 is stopped, the first display device 100 may transmit a turn-off signal to the external device 300 and enter the power saving mode. At this time, the communication connection between the first display device 100 and the second display device 200 may be released.

Figure 9:
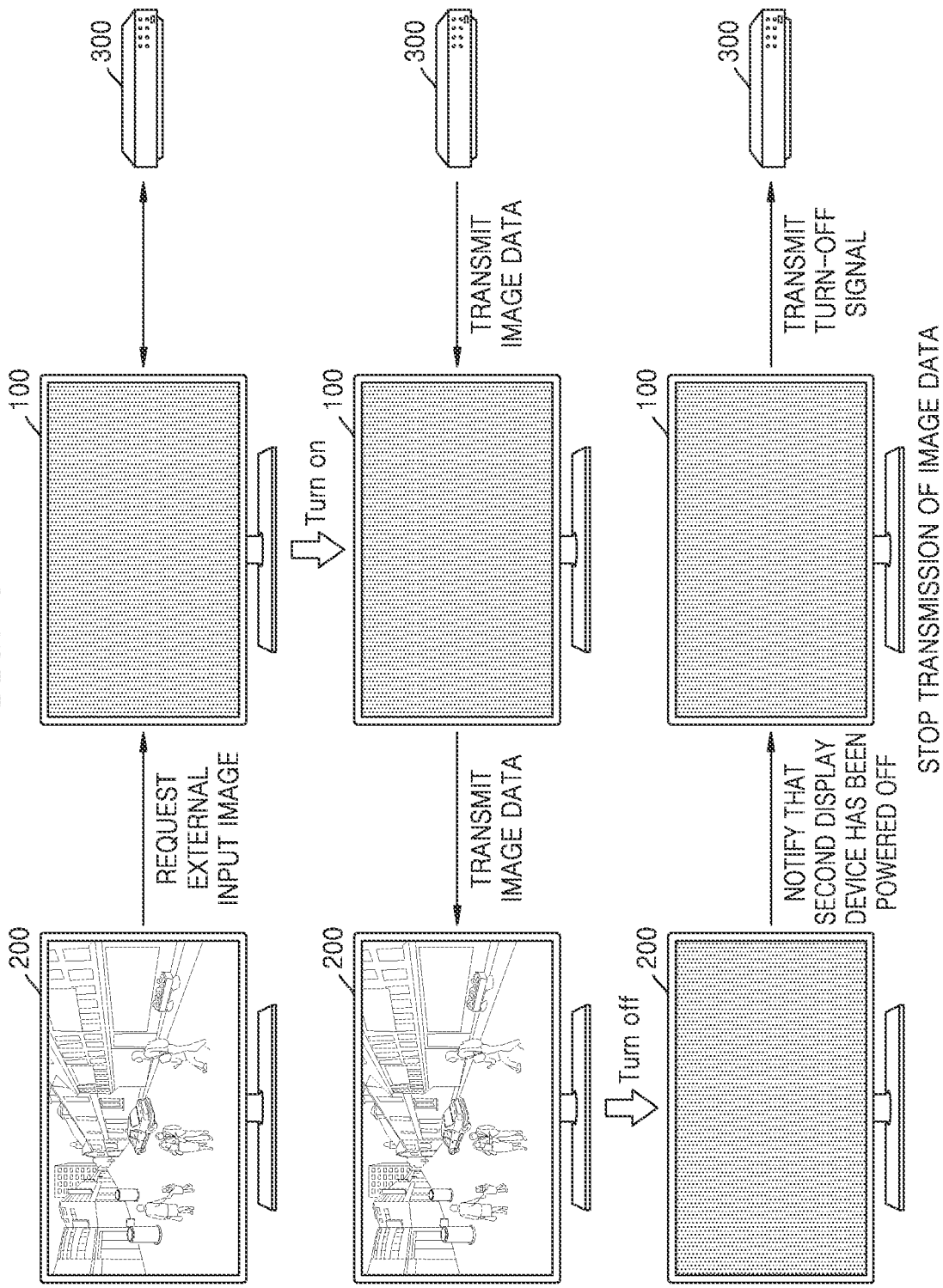
FIG. 9 is a diagram illustrating an example operation, performed by a first display device and a second display device, of controlling powering on/off, according to an embodiment of the disclosure.

FIG. 9 is a diagram illustrating an example operation, performed by a first display device and a second display device, of controlling powering on/off, according to an embodiment of the disclosure.

Referring to FIG. 9, the second display device 200 according to an embodiment of the disclosure may be connected to the first display device 100, and the first display device 100 may be connected to the external device 300.

The second display device 200 according to an embodiment of the disclosure may request an external input image from the first display device 100 that has been powered off, through an external input setting.

When the first display device 100 receives the request for the external input image from the second display device 200, the first display device 100 may power itself on. The first display device 100 may turn on the display and request the external input image from the external device 300. The first display device 100 may receive image data from the external device 300 and then transmit the image data to the second display device 200.

The second display device 200 may receive a turn-off signal while receiving the image data from the first display device 100. The second display device 200 may transmit information indicating that the second display device 200 has been powered, to the first display device 100.

When the first display device 100 receives the information indicating that the second display device 200 has been powered off from the second display device 200, the first display device 100 may stop or terminate the operation of receiving the image data from the external device 300, encoding the received image data, and transmitting the encoded image data to the second display device 200.

As the transmission of the image data is stopped, the first display device 100 may transmit a turn-off signal to the external device 300 and power off itself.

On the other hand, when a user input is received after the first display device 100 is turned on by the second display device 200, or when a user is detected around the first display device 100, the first display device 100 may remain powered on without being powered off. However, the disclosure is not limited thereto.

Figure 10:
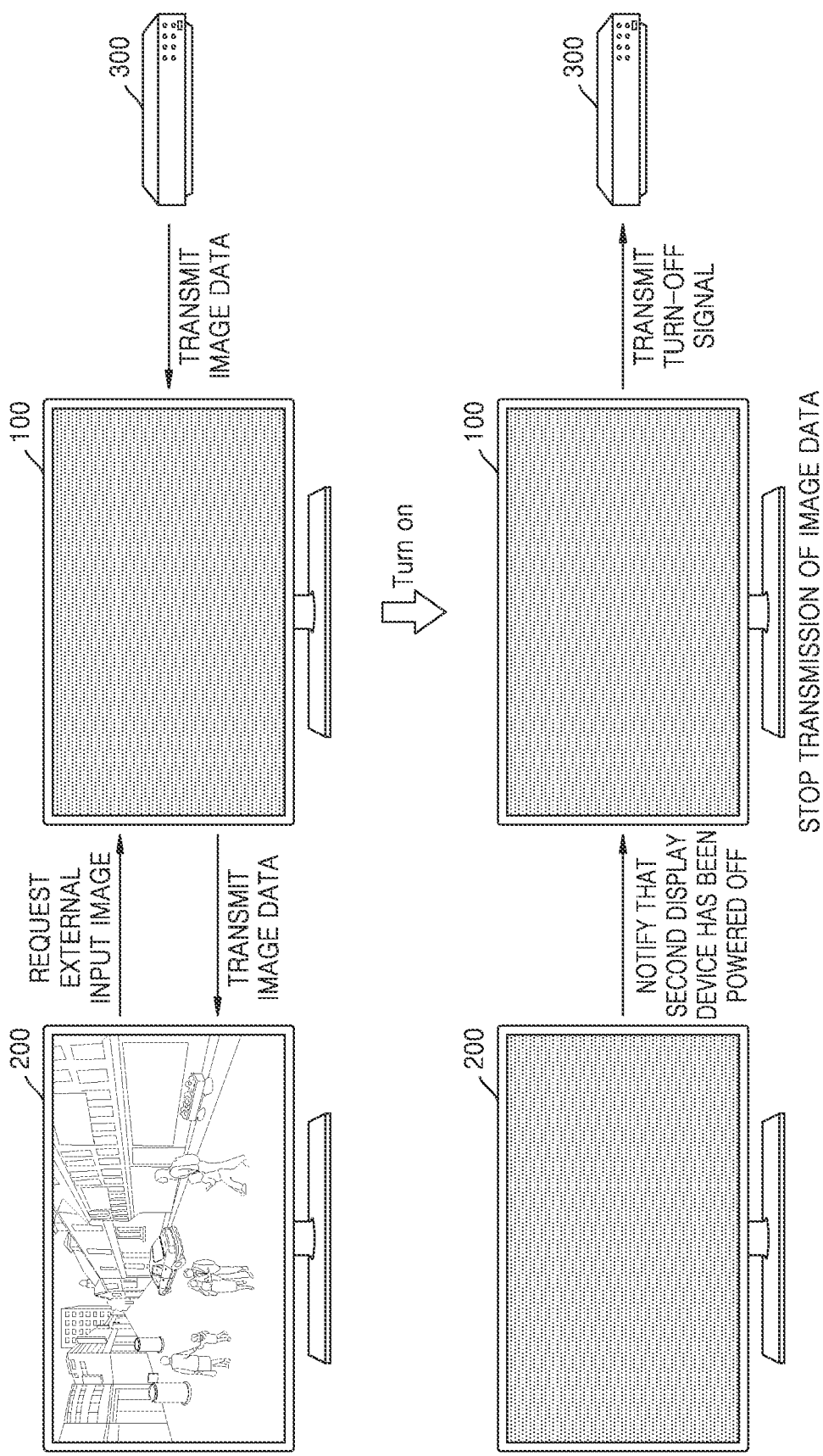
FIG. 10 is a diagram illustrating an example operation, performed by a first display device and a second display device, of controlling powering on/off, according to an embodiment of the disclosure.

FIG. 10 is a diagram illustrating an example operation, performed by a first display device and a second display device, of controlling powering on/off, according to an embodiment of the disclosure.

Referring to FIG. 10, the second display device 200 according to an embodiment of the disclosure may be connected to the first display device 100, and the first display device 100 may be connected to the external device 300.

The second display device 200 according to an embodiment of the disclosure may request an external input image from the first display device 100 that has been powered off, through an external input setting.

When the first display device 100 receives the request for the external input image from the second display device 200, the first display device 100 may power on itself. At this time, the first display device 100 may request the external input image from the external device 300 while keeping the display turned off. The first display device 100 may receive image data from the external device 300 and then transmit the image data to the second display device 200.

The second display device 200 may receive a turn-off signal while receiving the image data from the first display device 100. The second display device 200 may transmit information indicating that the the second display device 200 has been powered, to the first display device 100.

When the first display device 100 receives the information indicating that the second display device 200 has been powered off from the second display device 200, the first display device 100 may stop or terminate the operation of receiving the image data from the external device 300, encoding the received image data, and transmitting the encoded image data to the second display device 200.

As the transmission of the image data is stopped, the first display device 100 may transmit a turn-off signal to the external device 300 and power off itself.

On the other hand, when the first display device 100 receives a turn-on signal from the first control device controlling the first display device 100 after the first display device 100 is turned on by the second display device 200, the first display device 100 may remain powered on without being powered off. However, the disclosure is not limited thereto.

Figure 11:
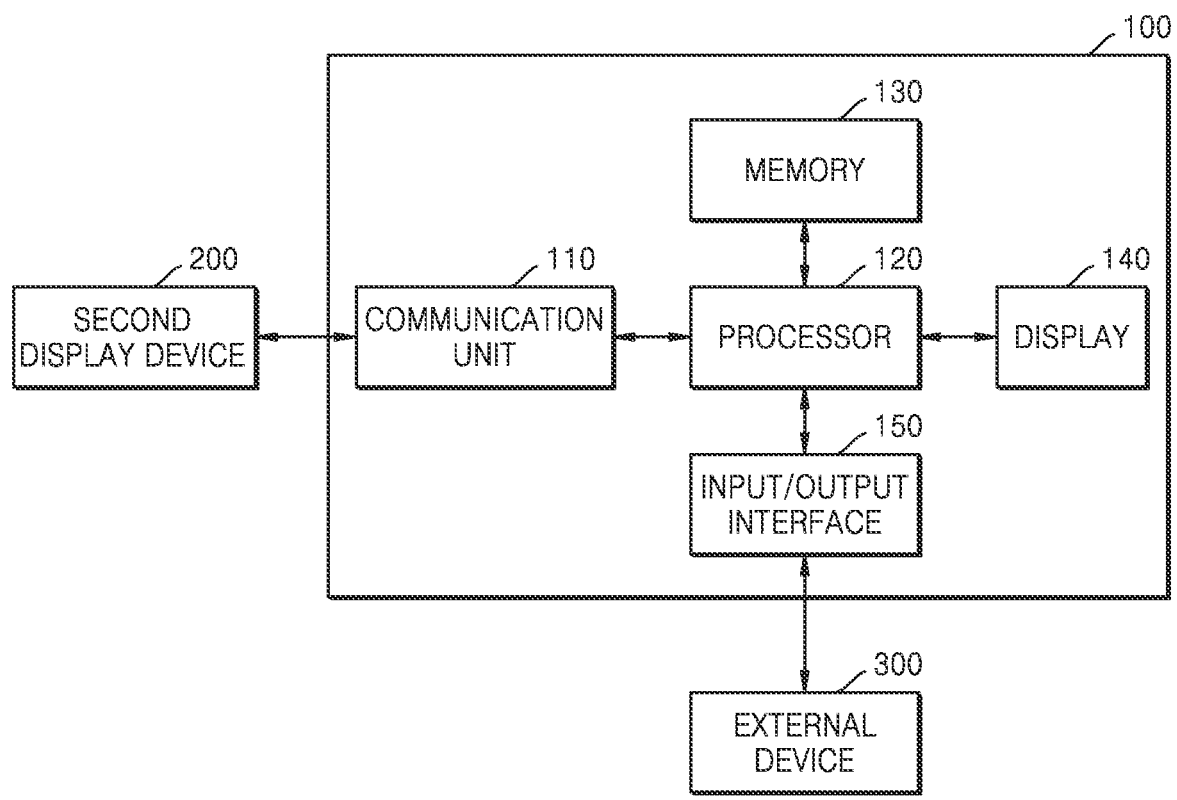
FIG. 11 is a block diagram illustrating an example configuration of a first display device according to an embodiment of the disclosure.

FIG. 11 is a block diagram illustrating an example configuration of a first display device according to an embodiment of the disclosure.

Referring to FIG. 11, the first display device 100 according to an embodiment of the disclosure may include a communication unit (e.g., including communication circuitry) 110, a processor (e.g., including processing circuitry) 120, a memory 130, a display 140, and an input/output interface (e.g., including interface circuitry) 150.

The communication unit 110 according to an embodiment of the disclosure may include various communication circuitry and transmit and receive data or signals to and from an external device (e.g., the second display device 200 or the first control device) or a server. For example, and without limitation, the communication unit 110 may include a Wi-Fi module, a Bluetooth module, an IR communication module, a wireless communication module, a LAN module, an Ethernet module, a wired communication module, and the like. Each communication module may be implemented as at least one hardware chip including various communication circuitry.

The Wi-Fi module and the Bluetooth module perform communication using a Wi-Fi scheme and a Bluetooth scheme, respectively. When the Wi-Fi module or the Bluetooth module is used, various pieces of connection information, such as a service set identifier (SSID) or a session key, may be first transmitted and received, and various pieces of information may be then transmitted and received after a communication connection is established using the connection information. The wireless communication module may include at least one communication chip configured to perform communication according to various wireless communication standards, such as Zigbee, $3^{rd}$ Generation (3G), 3rd Generation Partnership Project (3GPP), Long-Term Evolution (LTE), LTE Advanced (LTE-A), $4^{th}$ Generation (4G), $5^{th}$ Generation (5G), or the like.

The communication unit 110 according to an embodiment of the disclosure may receive a request for an external input image from the second display device 200 according to an embodiment of the disclosure, and transmit the external input image to the second display device 200.

The communication unit 110 according to an embodiment of the disclosure may receive a control signal or a control command from the first control device. For example, the communication unit 110 may include an IR module capable of transmitting and receiving signals to and from the first control device according to an IR communication standard. In detail, the communication unit 110 may receive a control signal or a control command corresponding to a user input (e.g., an input of a key or a button of the control device) from the first control device.

The processor 120 according to an embodiment of the disclosure may include various processing circuitry. For example, as used herein, including the claims, the term "processor" may include various processing circuitry, including at least one processor, wherein one or more processors of at least one processor may be configured to perform the various functions described herein. Additionally, the at least one processor may include a combination of processors performing various of the recited/disclosed functions. Additionally, the processor 120 controls the overall operation of the first display device 100 and a signal flow between internal components of the first display device 100, and processes data.

The processor 120 may include a single core, dual cores, triple cores, quad cores, or cores corresponding to a multiple thereof. In addition, the processor 120 may include a plurality of processors. For example, the processor 120 may be implemented as a main processor (not shown) and a sub-processor (not shown) operating in a sleep mode.

In addition, the processor 120 may include, for example, and without limitation, at least one a central processing unit (CPU), a graphics processing unit (GPU), or a video processing unit (VPU). According to an embodiment of the disclosure, the processor 120 may be implemented, for example, and without limitation, as a system on a chip (SoC) into which at least one of a CPU, a GPU, or a VPU is integrated. The processor 120 may further include a neural processing unit (NPU).

The memory 130 according to an embodiment of the disclosure may store various pieces of data, programs, or applications for driving and controlling the first display device 100.

In addition, the program stored in memory 130 may include one or more instructions. The program (e.g., the one or more instructions) or application stored in the memory 130 may be executed by the processor 120.

The processor 120 according to an embodiment of the disclosure may control the input/output interface 150 such that the first display device 100 is connected to the external device 300. In addition, the processor 120 may control the communication unit 110 such that the first display device 100 and the second display device 200 are communicatively connected to each other.

When the processor 120 receives, from the second display device 200, a request for an external input image corresponding to the external device 300, the processor 120 may request the external input image from the external device 300.

The processor 120 may encode image data received from the external device 300. For example, the processor 120 may perform encoding of the image data using any one of image processing methods using frequency conversion such as MPEG-2, H.264 AVC, MPEG-4, HEVC, VC-1, VP8, VP9, or AV1. However, the disclosure is not limited thereto.

The processor 120 may control the communication unit 110 to transmit the encoded image data to the second display device 200.

When the first display device 100 is powered off or in the power saving mode and receives a request for an external input image from the second display device 200, the processor 120 according to an embodiment of the disclosure may turn on a process and power for transmitting the external input image to the second display device 200.

In addition, the processor 120 may perform an operation of transmitting an external input image to the second display device 200, in a state where the display 140 is turned on or off.

When the processor 120 according to an embodiment of the disclosure receives a turn-off signal, the processor 120 may identify whether an operation of transmitting an external input image to another display device is being performed.

When the operation of transmitting an external input image to another display device is being performed, the processor 120 according to an embodiment of the disclosure may turn off the display 140. Here, turning off the display 140 may refer to changing a display screen to a black screen.

In addition, the processor 120 may continuously perform the operation of transmitting the external input image to the other display device without stopping.

The processor 120 may monitor the state of the operation of transmitting the external input image to the other display device.

When an operation of transmitting an external input image to another display device is not being performed, or when an operation of transmitting an external input image to another display device is terminated, the processor 120 according to an embodiment of the disclosure may control the input/output interface 150 to transmit a termination signal to the external device 300. For example, when the first display device 100 and the external device 300 are connected to each other through an HDMI cable, the processor 120 may control the external device 300 using HDMI-CEC. The processor 120 may power off the external device 300 by transmitting a turn-off signal to the external device 300 using HDMI-CEC.

In addition, the processor 120 according to an embodiment of the disclosure may transmit a turn-off signal to other external devices than the external device 300, which are connected to the first display device 100. However, the disclosure is not limited thereto.

The processor 120 according to an embodiment of the disclosure may switch to the power saving mode. For example, the processor 120 may store information about operations being performed by the processor 120, in the memory 130. In addition, the processor 120 may perform control to maintain power supplied to the memory 130 such that data stored in the memory 130 is maintained even when switching to the power saving mode.

When a request to stop the transmission of the external input image is received from the second display device 200, the processor 120 according to an embodiment of the disclosure may stop or terminate the operation of receiving the image data from the external device 300, encoding the received image data, and transmitting the encoded image data to the second display device 200.

When information indicating that the second display device 200 has been powered off is received from the second display device 200, the processor 120 according to an embodiment of the disclosure may stop or terminate the operation of receiving the image data from the external device 300, encoding the received image data, and transmitting the encoded image data to the second display device 200.

As the transmission of the external input image to the second display device 200 is stopped, the processor 120 according to an embodiment of the disclosure may transmit a turn-off signal to the external device 300 and enter the power saving mode.

The display 140 according to an embodiment of the disclosure may convert an image signal, a data signal, an on-screen display (OSD) signal, a control signal, or the like, that has been processed by the processor 120, to generate a driving signal. The display 140 may be implemented, for example, and without limitation, as a plasma display panel (PDP), a liquid-crystal display (LCD), an organic light-emitting diode (OLED), a flexible display, a three-dimensional (3D) display, or the like. In addition, the display 140 may be configured as a touch screen to be used as both an output device and an input device.

The input/output interface 150 according to an embodiment of the disclosure may include various interface circuitry and receive a video (e.g., a moving image), an audio (e.g., a voice or a music), and additional information (e.g., an electronic programming guide (EPG)) from the outside of the first display device 100. The input/output interface 150 may include any one of an port, an MHL port, a USB port, a DP port, a Thunderbolt port, a VGA port, an RGB port, a D-SUB port, a DVI port, a component jack, and a PC port.

Figure 12:
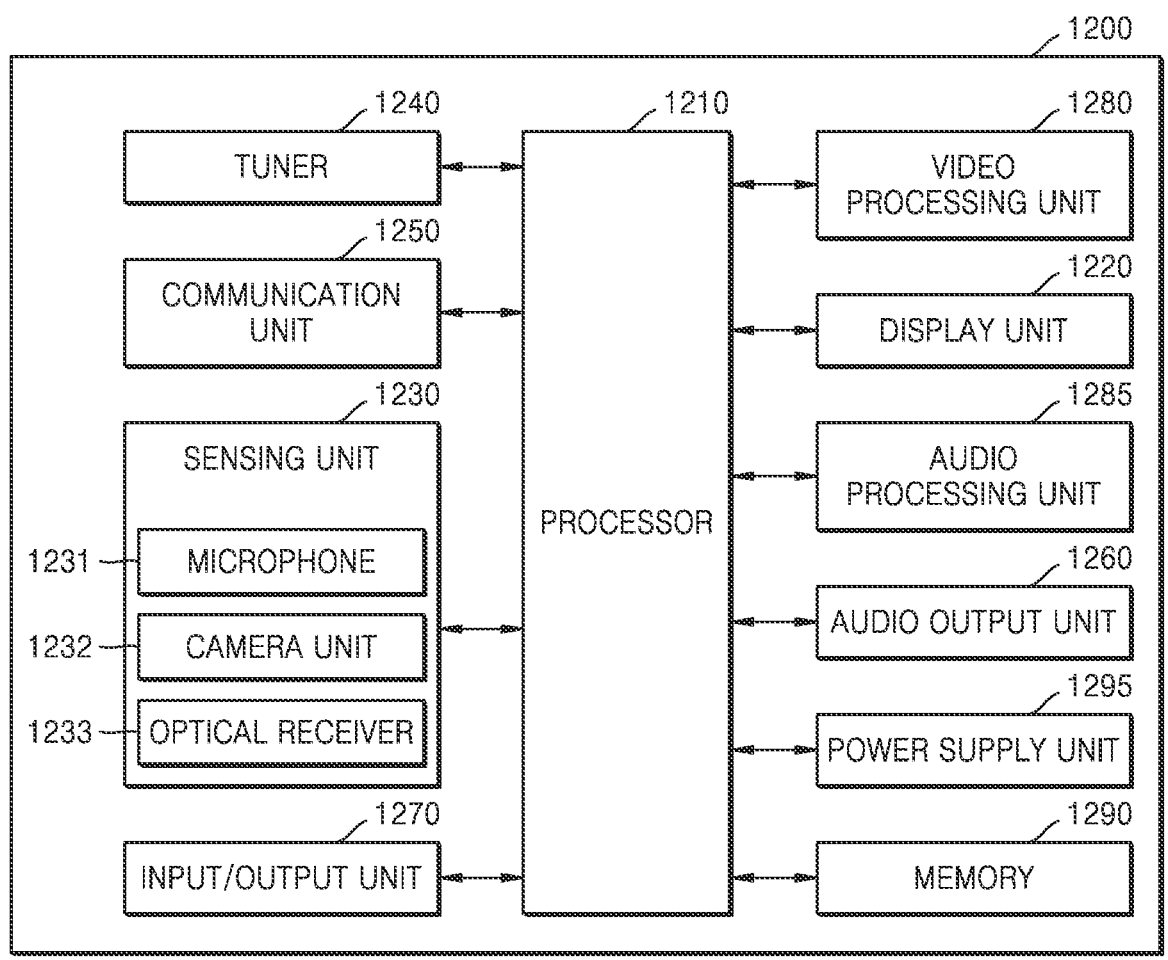
FIG. 12 is a block diagram illustrating an example configuration of a display device according to an embodiment of the disclosure.

FIG. 12 is a block diagram illustrating an example configuration of a display device according to an embodiment of the disclosure.

Referring to FIG. 12, a display device 1200 of FIG. 12 may be an example of the first display device 100 or the second display device 200 described above with reference to FIGS. 1 to 11.

Referring to FIG. 12, the display device 1200 according to an embodiment of the disclosure may include a tuner 1240, a processor (e.g., including processing circuitry) 1210, a display unit (e.g., including a display) 1220, a communication unit (e.g., including communication circuitry) 1250, a sensing unit (e.g., including various sensors and/or sensing circuitry) 1230, an input/output unit (e.g., including input/output circuitry) 1270, a video processing unit (e.g., including video processing circuitry) 1280, an audio processing unit (e.g., including audio processing circuitry) 1285, an audio output unit (e.g., including audio output circuitry) 1260, a memory 1290, and a power supply unit (e.g., including a power supply) 1295.

The communication unit 1250 of FIG. 12 corresponds to the communication unit 110 of FIG. 11, the processor 1210 of FIG. 12 corresponds to the processor 120 of FIG. 11, the memory 1290 of FIG. 12 corresponds to the memory 130 of FIG. 11, the display unit 1220 of FIG. 12 corresponds to the display 140 of FIG. 11, and the input/output unit 1270 of FIG. 12 corresponds to the input/output interface 150 of FIG. 11. Thus, the descriptions thereof provided above may not be repeated here.

The tuner 1240 according to an embodiment of the disclosure may be tuned to and select only a frequency of a channel desired to be received by the display device 1200 from among a number of radio wave components by performing, for example, amplification, mixing, and resonance on a broadcast signal received in a wired or wireless manner. The broadcast signal includes an audio, a video, and additional information (e.g., an EPG).

The tuner 1240 may receive a broadcast signal from various sources, such as terrestrial, cable, satellite, and Internet broadcasters. The tuner 1240 may also receive a broadcast signal from a source such as an analog or digital broadcaster.

The sensing unit 1230 may include various sensors and/or sensing circuitry and detect a voice, an image, or an interaction of a user, and may include a microphone 1231, a camera unit 1232, and an optical receiver 1233.

The microphone 1231 receives a voice uttered by the user. The microphone 1231 may convert the received voice into an electrical signal and output the electrical signal to the processor 1210. The voice of the user may include, for example, a voice corresponding to a menu or a function of the display device 1200.

The camera unit 1232 may include a camera and receive an image (e.g., consecutive frames) corresponding to a motion of the user, including a gesture, in the recognition range of a camera. The processor 1210 may select a menu to be displayed on the display device 1200 or perform a control operation based on a result of recognizing the received motion.

The optical receiver 1233 may receive an optical signal (including a control signal) from an external control device through an optical window (not shown) of a bezel of the display unit 1220. The optical receiver 1233 may receive, from the control device, an optical signal corresponding to a user input (e.g., a touch, a push, a touch gesture, a voice, or a motion). A control signal may be extracted from the received optical signal, under control of the processor 1210.

The processor 1210 may include various processing circuitry. For example, as used herein, including the claims, the term "processor" may include various processing circuitry, including at least one processor, wherein one or more processors of at least one processor may be configured to perform the various functions described herein. Additionally, the at least one processor may include a combination of processors performing various of the recited/disclosed functions. Additionally, the processor 1210 controls the overall operation of the display device 1200 and a signal flow between internal components of the display device 1200, and processes data. When a user input is received or a preset and stored condition is satisfied, the processor 1210 may execute an operating system (OS) and various applications stored in the memory 1290.

The processor 1210 may include random-access memory (RAM) to store signals or data input from outside the display device 1200 or to be used as a storage for various operations performed by the display device 1200, read-only memory (ROM) storing a plurality of instructions and/or a control program for controlling the display device 1200, and a processor.

The video processing unit 1280 may include various video processing circuitry and processes video data received by the display device 1200. The video processing unit 1280 may perform various image processing operations, such as decoding, scaling, noise removal, frame rate conversion, or resolution conversion, on the video data.

The audio processing unit 1285 may include various audio processing circuitry and processes audio data. The audio processing unit 1285 may perform various processing operations, such as decoding, amplification, or noise removal, on the audio data. In addition, the audio processing unit 1285 may include a plurality of audio processing modules configured to process an audio corresponding to a plurality of pieces of content.

The audio output unit 1260 may include various audio output circuitry and outputs an audio included in a broadcast signal received through the tuner 1240 under control of the processor 1210. The audio output unit 1260 may output an audio (e.g., a voice or a sound) input through the communication unit 1250 or the input/output unit 1270. In addition, the audio output unit 1260 may output an audio stored in the memory 1290 under control of the processor 1210. The audio output unit 1260 may include at least one of a speaker, a headphone output port, or a Sony/Philips Digital Interface (S/PDIF) output port.

The power supply unit 1295 may include a power supply and supplies power input from an external power source, to the components inside the display device 1200 under control of the processor 1210. In addition, the power supply unit 1295 may supply power output from one or more batteries (not shown) in the display device 1200, to the internal components, under control of the processor 1210.

The memory 1290 may store various pieces of data, programs, or applications for driving and controlling the display device 1200 under control of the processor 1210. The memory 1290 may include various modules, each of which may include various executable program instructions, including, for example and without limitation, a broadcast receiving module, a channel control module, a volume control module, a communication control module, a speech recognition module, a motion recognition module, an optical receiving module, a display control module, an audio control module, an external input control module, a power control module, a power control module of an external device connected in a wireless manner (e.g., Bluetooth), a speech database (DB), or a motion DB, which is not illustrated. The modules and the DBs of the memory 1290, which are not illustrated, may be implemented in the form of software for the display device 1200 to perform a function of controlling broadcast reception, a channel control function, a volume control function, a communication control function, a voice recognition function, a motion recognition function, a light reception control function, a display control function, an audio control function, an external input control function, a power control function, or a power control function of an external device connected in a wireless manner (e.g., Bluetooth). The processor 1210 may perform each function using the software stored in the memory 1290.

The block diagrams of the display devices 100 and 1200 illustrated in FIGS. 11 and 12 are merely examples. Each component illustrated in the block diagrams may be integrated, added, or omitted according to the specification of the display device 100 or 1200 actually implemented. For example, two or more components may be integrated into one component, or one component may be divided into two or more components, as necessary. In addition, a function performed by each block is for describing embodiments of the disclosure, and its detailed operation or device does not limit the scope of the disclosure.

A display device according to an example embodiment of the disclosure may include: a display, a communication unit comprising communication circuitry, a memory storing one or more instructions, and at least one processor, comprising processing circuitry, configured to execute the one or more instructions.

The at least one processor may execute the one or more instructions to control the communication unit to transmit image data received from an external device connected to the display device, to another display device connected to the display device.

The at least one processor may execute the one or more instructions to, based on receiving a power-off signal, identify whether an operation of transmitting the image data to the other display device is being performed.

The at least one processor may execute the one or more instructions to, based on the operation of transmitting the image data to the other display device being performed, turn off the display and enter a power-off suspend mode in which the operation of transmitting the image data to the other display device is maintained.

The at least one processor may execute the one or more instructions to, based on the operation of transmitting the image data to the other display device being terminated in the power-off suspend mode, switch to a power saving mode.

The display device according to various example embodiments may further include an input/output interface comprising circuitry connected to the external device.

The external device according to various example embodiments may be connected to the display device through an HDMI port or a display port.

At least one processor according to various example embodiments may execute the one or more instructions to encode image data received from the external device.

At least one processor according to various example embodiments may execute the one or more instructions to control the communication unit to transmit the encoded image data to the other display device.

At least one processor according to various example embodiments may execute the one or more instructions to, in the power-off suspend mode, monitor a state of the operation of transmitting the image data to the other display device.

At least one processor according to various example embodiments may execute the one or more instructions to: receive the power-off signal, and based on the operation of transmitting the image data to the other display device not being performed, enter the power saving mode.

At least one processor according to various example embodiments may execute the one or more instructions to, based on entering the power saving mode, control the memory to store information about at least one operation being performed by the display device.

The power saving mode according to various example embodiments may include a state in which supply of power to at least one processor is stopped such that an operation of at least one processor is stopped, and supply of power to the memory is maintained.

The display device according to various example embodiments may further include an input/output interface comprising circuitry connected to the external device.

At least one processor according to various example embodiments may execute the one or more instructions to, in the power saving mode, control the input/output interface to transmit a power-off signal to the external device.

At least one processor according to various example embodiments may execute the one or more instructions to: based on the operation of transmitting the image data to the other display device being terminated, store information about operations being performed by the display device, and switch to the power saving mode.

At least one processor according to various example embodiments may execute the one or more instructions to, based on receiving, from the other display device, a request to stop the transmission of the image data, terminate the operation of transmitting the image data to the other display device.

At least one processor according to various example embodiments may execute the one or more instructions to, based on receiving, from the other display device, state information indicating that the other display device is powered off, terminate the operation of transmitting the image data to the other display device.

At least one processor according to various example embodiments may execute the one or more instructions to, based on receiving, from the other display device, the state information indicating that the other display device is powered off, control the communication unit to disconnect from the other display device.

A method of operating a display device according to an example embodiment of the disclosure may include transmitting image data received from an external device connected to the display device, to another display device connected to the display device, The method of operating the display device according to an example embodiment of the disclosure may further include receiving a power-off signal.

The method of operating the display device according to an example embodiment of the disclosure may further include, based on receiving the power-off signal, identifying whether an operation of transmitting the image data to the other display device is being performed.

The method of operating the display device according to an example embodiment of the disclosure may further include, based on the operation of transmitting the image data to the other display device being performed, turning off a display and entering a power-off suspend mode in which the operation of transmitting the image data to the other display device is maintained.

The method of operating the display device according to an example embodiment of the disclosure may further include, based on the operation of transmitting the image data to the other display device being terminated in the power-off suspend mode, switching to a power saving mode.

The method of operating the display device according to an example embodiment of the disclosure may further include connecting the external device to the display device through an HDMI port or a display port.

The transmitting of the image data received from the external device connected to the display device, to the other display device connected to the display device, may according to an example embodiment include encoding the image data received from the external device.

The transmitting of the image data received from the external device connected to the display device, to the other display device connected to the display device, may according to an example embodiment further include transmitting the encoded image data to the other display device.

The method of operating the display device according to an example embodiment of the disclosure may further include, in the power-off suspend mode, monitoring a state of the operation of transmitting the image data to the other display device.

The method of operating the display device according to an example embodiment of the disclosure may further include receiving the power-off signal, and based on the operation of transmitting the image data to the other display device not being performed, entering the power saving mode.

The method of operating the display device according to an example embodiment of the disclosure may further include, in the power saving mode, transmitting a power-off signal to the external device.

The switching to the power saving mode may according to an example embodiment include, based on the operation of transmitting the image data to the other display device being terminated, storing information about operations being performed by the display device, and switching to the power saving mode.

The method of operating the display device according to an example embodiment of the disclosure may further include receiving, from the other display device, a request to stop the transmission of the image data.

The method of operating the display device according to an example embodiment of the disclosure may further include, based on receiving the request to stop the transmission, terminating the operation of transmitting the image data to the other display device.

The method of operating the display device according to an example embodiment of the disclosure may further include receiving, from the other display device, state information indicating that the other display device is powered off.

The method of operating the display device according to an example embodiment of the disclosure may further include, based on receiving, from the other display device, the state information indicating that the other display device is powered off, terminating the operation of transmitting the image data to the other display device.

The method of operating the display device according to an example embodiment of the disclosure may further include, based on receiving, from the other display device, the state information indicating that the other display device is powered off, releasing connection with the other display device.

The display device according to an embodiment of the disclosure may maintain an operation of transmitting image data of an external device to another display device even when a power-off signal is received while transmitting the image data of the external device to the other display device, thereby preventing/reducing viewing of external images by a user of the other display device from being terminated.

The method of operating the display device according to an embodiment of the disclosure may be embodied as program commands executable by various computer devices, and recorded on a computer-readable medium. The computer-readable medium may include program commands, data files, data structures, or the like separately or in combinations. The program commands to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as a compact disc ROM (CD-ROM) or a DVD, magneto-optical media such as a floptical disk, and hardware devices such as ROM, RAM, or flash memory, which are specially configured to store and execute program commands. Examples of the program commands include not only machine code, such as code made by a compiler, but also high-level language code that is executable by a computer using an interpreter or the like.

In addition, the operation method of a display device according to embodiments of the disclosure may be included in a computer program product and provided. The computer program product may be traded as commodities between sellers and buyers.

The computer program product may include a S/W program and a computer-readable recording medium storing the S/W program. For example, the computer program product may include a product in the form of a S/W program electronically distributed (e.g., a downloadable application) through a manufacturer of an electronic device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

The computer program product may include a storage medium of a server or a storage medium of a client device, in a system including the server and the client device. Alternatively, when there is a third device (e.g., a smart phone) communicatively connected to the server or the client device, the computer program product may include a storage medium of the third device. Alternatively, the computer program product may include a software program, which is transmitted from the server to the client device or the third device or transmitted from the third device to the client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, the server (e.g., a cloud server, an artificial intelligence server) may execute the computer program product stored in the server to control the client device communicatively connected to the server to perform the method according to the embodiments of the disclosure.

Although various example embodiments have been described above in detail, the scope of the disclosure is not limited thereto, and various modifications and alterations by those skilled in the art may be made. The following claims also fall within the scope of the disclosure. It will also be understood that any of the embodiment(s) described herein may be used in conjunction with any other embodiment(s) described herein.

What is claimed is:

1. A display device comprising:
a display;
a communication unit comprising communication circuitry;
a memory storing one or more instructions; and
at least one processor, comprising processing circuitry, configured to execute the one or more instructions to:
control the communication unit to transmit image data received from an external device connected to the display device to another display device connected to the display device, based on receiving a power-off signal,
identify whether transmitting the image data to the other display device is being performed, based on transmitting the image data to the other display device being performed,
turn off the display and enter a power-off suspend mode in which the transmitting the image data to the other display device is maintained, and
based on the transmitting the image data to the other display device being terminated in the power-off suspend mode, switch to a power saving mode.

2. The display device of claim 1, further comprising an input/output interface comprising circuitry connectable to the external device,
wherein the external device is connected to the display device through a High-Definition Multimedia Interface (HDMI) port or a display port.

3. The display device of claim 1, wherein at least one processor is configured to execute the one or more instructions to encode image data received from the external device, and control the communication unit to transmit the encoded image data to the other display device.

4. The display device of claim 1, wherein at least one processor is configured to execute the one or more instructions to, in the power-off suspend mode, monitor a state of transmitting the image data to the other display device.

5. The display device of claim 1, wherein at least one processor is configured to execute the one or more instructions to receive the power-off signal, and based on transmitting the image data to the other display device not being performed, enter the power saving mode.

6. The display device of claim 1, wherein at least one processor is configured to execute the one or more instructions to, based on entering the power saving mode, store information about at least one operation being performed by the display device in the memory, and
wherein the power saving mode includes a state in which supply of power to at least one processor is stopped such that an operation of at least one processor is stopped, and supply of power to the memory is maintained.

7. The display device of claim 1, further comprising an input/output interface comprising circuitry connected to the external device,
wherein at least one processor is configured to execute the one or more instructions to, based on entering the power saving mode, control the input/output interface to transmit a power-off signal to the external device.

8. The display device of claim 1, wherein at least one processor is configured to execute the one or more instructions to based on transmitting the image data to the other display device being terminated, store information about operations being performed by the display device, and switch to the power saving mode.

9. The display device of claim 1, wherein at least one processor is configured to execute the one or more instructions to, based on receiving, from the other display device, a request to stop the transmission of the image data, terminate transmitting the image data to the other display device.

10. The display device of claim 1, wherein at least one processor is configured to execute the one or more instructions to, based on receiving, from the other display device, state information indicating that the other display device is powered off, terminate transmitting the image data to the other display device, and control the communication unit to disconnect from the other display device.

11. A method of operating a display device, the method comprising:
transmitting image data received from an external device connected to the display device, to another display device connected to the display device;
receiving a power-off signal;
based on receiving the power-off signal, identifying whether transmitting the image data to the other display device is being performed;
based on transmitting the image data to the other display device being performed, turning off a display of the display device and entering a power-off suspend mode in which transmitting the image data to the other display device is maintained; and
based on transmitting the image data to the other display device being terminated in the power-off suspend mode, switching to a power saving mode.

12. The method of claim 11, further comprising connecting the external device to the display device through a High-Definition Multimedia Interface (HDMI) port or a display port.

13. The method of claim 11, wherein the transmitting of the image data received from the external device connected to the display device, to the other display device connected to the display device, comprises:
encoding the image data received from the external device; and
transmitting the encoded image data to the other display device.

14. The method of claim 11, further comprising, in the power-off suspend mode, monitoring a state of transmitting the image data to the other display device.

15. The method of claim 11, further comprising receiving the power-off signal, and based on transmitting the image data to the other display device not being performed, entering the power saving mode.

16. The method of claim 11, further comprising, based on entering the power saving mode, transmitting a power-off signal to the external device.

17. The method of claim 11, wherein the switching to the power saving mode comprises, based on transmitting the image data to the other display device being terminated, storing information about operations being performed by the display device, and switching to the power saving mode.

18. The method of claim 11, further comprising:
receiving, from the other display device, a request to stop the transmission of the image data; and
based on receiving the request to stop the transmission, terminating transmitting the image data to the other display device.

19. The method of claim 11, further comprising:
receiving, from the other display device, state information indicating that the other display device is powered off; and
based on receiving, from the other display device, the state information indicating that the other display device is powered off, terminating transmitting the image data to the other display device, and disconnecting from the other display device.

20. A non-transitory computer-readable recording medium having recorded thereon a program for which, when executed by at least one processor of an electronic device, causes the electronic device to perform operations according to the method of claim 11.

* * * * *